(12) United States Patent
Polcyn

(10) Patent No.: US 6,246,989 B1
(45) Date of Patent: *Jun. 12, 2001

(54) SYSTEM AND METHOD FOR PROVIDING AN ADAPTIVE DIALOG FUNCTION CHOICE MODEL FOR VARIOUS COMMUNICATION DEVICES

(75) Inventor: Michael J. Polcyn, Allen, TX (US)

(73) Assignee: InterVoice Limited Partnership, Reno, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/899,952

(22) Filed: Jul. 24, 1997

(51) Int. Cl.$^7$ ........................................... G10L 15/22
(52) U.S. Cl. ........................ 704/275; 345/333; 379/88.14
(58) Field of Search ..................... 704/275, 270, 704/257, 255; 378/88.01, 88.14, 88.17; 345/3, 333, 335

(56) References Cited

U.S. PATENT DOCUMENTS

| | | | |
|---|---|---|---|
| 5,261,042 | * 11/1993 | Brandt | 345/333 |
| 5,524,137 | * 6/1996 | Rhee | 379/88.01 |
| 5,524,142 | * 6/1996 | Lewis et al. | 379/112 |
| 5,539,661 | * 7/1996 | Nordenstam | 379/355 |
| 5,680,511 | * 10/1997 | Baker | 709/226 |
| 5,754,111 | * 5/1998 | Garcia | 707/104 |
| 5,802,526 | * 9/1998 | Fawcett et al. | 340/573.1 |
| 5,822,404 | 10/1998 | Cave | 379/67 |
| 5,825,856 | 10/1998 | Porter et al. | 379/93.12 |
| 5,912,952 | * 6/1999 | Brendzel | 379/93.25 |

FOREIGN PATENT DOCUMENTS

| | | | |
|---|---|---|---|
| 0 949571 A2 | 10/1999 | (EP) | G06F/17/22 |
| 0949571 A3 | 10/1999 | (EP) | G06F/17/22 |

OTHER PUBLICATIONS

PCT Search Report mailed Nov. 16, 2000 (PCT/US99/28004).
Paul Resnick, "Phone–Based CSCW: Tools and Trials," ACM Transactions on Information Systems, vol. 11, iss. 4 (1993), pp. 401–424.*

* cited by examiner

Primary Examiner—William R. Korzuch
Assistant Examiner—Donald L. Storm
(74) Attorney, Agent, or Firm—Fulbright & Jaworski L.L.P.

(57) ABSTRACT

The inventive system provides a user with a plurality of function choices based upon the communication device of the user. The system includes a device specific variable state transition model that formats the system functions into the function choices based upon a device of the user. Thus, if the user has a personal computer or other device with a large screen, the functions are formatted into a single level so that all of the functions are displayed simultaneously. If the user has a TDD or PDA or other device with a small screen, the functions are formatted into two or more levels, depending upon the screen size, so that only a manageable portion of the functions are displayed simultaneously. If the system lacks a screen, then the functions are formatted into a plurality of levels, each level having only a small number of function choices. The system uses a data base having key words that describe each function, and permutation lists that have expanded lists of phrases that are synonymous with the key words. The system also may use a thesaurus or lexicon application to expand the recognition of key words. The system uses a dialogue engine to compare the commands (e.g., voice input) from the user with the key words and permutation lists to identify the requested function.

72 Claims, 3 Drawing Sheets

SYSTEM AND METHOD FOR PROVIDING AN ADAPTIVE DIALOG FUNCTION CHOICE MODEL FOR VARIOUS COMMUNICATION DEVICES

BACKGROUND OF THE INVENTION

The existing prior art uses a scripting tool and an execution environment for interactive voice mail audio text that defines scripts in a very linear fashion. For instance, a script definition could be "wait for a telephone ring." When the phone the rings, then answer; prompt the caller with a predefined set of choices; receive the selected choice via either DTMF or voice recognition, and then perform the selected function.

FIG. 7 is a diagram of flow of typical prior art interactive voice recognition/DTMF program 700, i.e., "for information regarding . . . speak or press 1 now". Typical programs follow a sequence of events: telephone ring and answer 701, prompt and greet the caller 702, present some finite number of choices or functions 704 in a predetermined fashion 703, and receive the user input 705 either through a DTMF input or a voice command. Then perform the selected function 706, and so forth.

Whether the system uses a voice recognition choice or a numeric DTMF input, some function is invoked, and again in a very predetermined manner, the caller is returned to the prompt 702 at the beginning of the program. The prior art system is very inflexible in that the flow of the choices or functions, and the presentation of those choices, are tied very tightly to the functions in the function definition.

The limitation of the prior art is that it is very rigid and only able to present a finite number of options to the caller in a predetermined fashion. Moreover, the logic of the presentation to the caller is preset, and thus is limited by the creativity of the system programmer.

SUMMARY OF THE INVENTION

The invention is to decouple the invocation and execution of functions from the manner in which they are selected. For instance, in a listing of twenty-five functions in a voice menu, via DTMF, no more than three or four choices are presented to the caller using DTMF at any given menu step in the call. This is because of ergonomic or human limitations. However, if the same functions are displayed on a screen to the caller, for example via an internet session, there is no reason that all twenty-five of the functions could not be presented at the same time. By decoupling the functions from the method by which those functions are invoked, the functions can be leveraged across many different access devices and technologies.

For example, a twenty-five function system can be invoked from voice menus by grouping certain sets of the functions through a choice engine or choice selection mechanism. However, a graphical interface allows the presentation of many more options, if not all options, to the caller.

Another advantage is that both natural language voice recognition and screen based interfaces allow the user to exit to the top level choices in the choice engine once the user completes a function. While in the prior art, the user is very restricted as to allowable navigation through functions because of how functions are nested. Specifically, a user may only move up one level at a time. Thus, all possible navigation paths must be pre-defined by the programmer. The invention allows for dynamic addition and deletion of both function and access methods. Decoupling of the functions allows for a fully webbed navigation of the system. The user can go from function 1, directly to function 2, then to function 3 without necessarily having to return to the top level menu or choice engine. This provides more efficient navigation to desired functions.

A technical advantage of the present invention is to promote re-use of defined functions.

Another technical advantage of the present invention is to allow the addition of new access methods independent of functions.

A further technical advantage of the present invention is to allow the addition of new functions independent of defined functions.

A further technical advantage of the present invention is to have a device specific variable state transition model that formats the different functions into function choices based upon a device of the user.

A further technical advantage of the present invention is to have a key word data base comprising key words used to describe each function in the system, and to have a plurality of permutation lists comprising expanded lists of phrases that are synonymous with the key words.

A further technical advantage of the present invention is to have a dialogue engine for parsing voice input from the user into segments and examining each segment for key words and expanded phrases for identifying the requested function.

A further technical advantage of the present invention is to have a learning operation for ascertaining the meaning and the function association for an unknown phrase received from the user, and amending the key word data base and permutation lists to include the unknown phrase.

A further technical advantage of the present invention is to have the permutation lists predefined by applying thesaurus and lexicon applications to the key word data base.

A further technical advantage of the present invention is to use a format controller for determining characteristics of the device, and arranging the functions into function choices based upon limitations of the device.

The foregoing has outlined rather broadly the features and technical advantages of the present invention in order that the detailed description of the invention that follows may be better understood. Additional features and advantages of the invention will be described hereinafter which form the sabject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
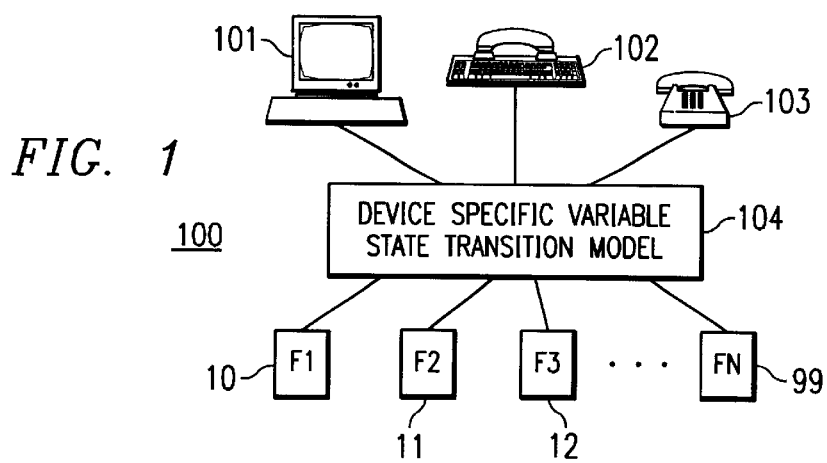
FIG. 1 depicts the inventive hyperlink system.

FIG. 1 depicts the inventive hyperlink system 100. The system 100 interacts with various types of communications equipment, including a personal computer or PC 101. The interface with the PC 101 may be some proprietary PC interface, a graphical interface or possibly an internet browser interface. Another type of communication equipment may be a TDD (telecommunication device for the deaf) screen phone 102, which is a telephone device with a VDT screen for displaying text or images. The screen phone may be a PDA (personal data assistant). A further type of communication equipment that interacts with the system is a telephone interface 102. This interface 102 may be to a standard DTMF telephone, but this interface may also be to many other types of telephonic devices including faxes and other devices that allow for dialogue. The device specific variable state transition model 104 acts as an interpretive assembler in that the model selects and arranges the various functions 10, 11, 12, 99 based upon the requesting device, i.e., the computer 101, the screen phone 102, and the telephone 103. The functions 10, 11, 12, 99 represent the various options and choices that a system user has when operating the system. The system 100 of FIG. 1 can be divided into three sections, the devices 101, 102, 103, the device specific variable state transition model 104, and the functions 10, 11, 12, 99. This system 100 that will present choices and options, or functions 10, 11, 12, 99 to the user in a variable manner based on the devices type 101, 102, 103 that the user is using to access the system, without forcing the system programmer to anticipate all the different devices that may attempt to access the system when the programmer develops the code for the system.

An example of the system 100 is a banking system. Function 10, for instance, in the banking application, may be a savings account menu. Function 11 may be a checking account menu; function 12 may be a credit card account menu; and another function may be a loan application function. On a touch tone telephone for instance, the user would be offered these different functions as voice choices with DTMF input. Specifically, push one for savings, push two for checking and so on. If the user entered the system with a PC, however, the different functions may be presented in a series of text choices or graphical icons. The inventive system 100 relieves the programmer of having to anticipate the navigation portion, i.e., device specific portion for determining the different functions and how these functions access the data and format the data for output.

Figure 2:
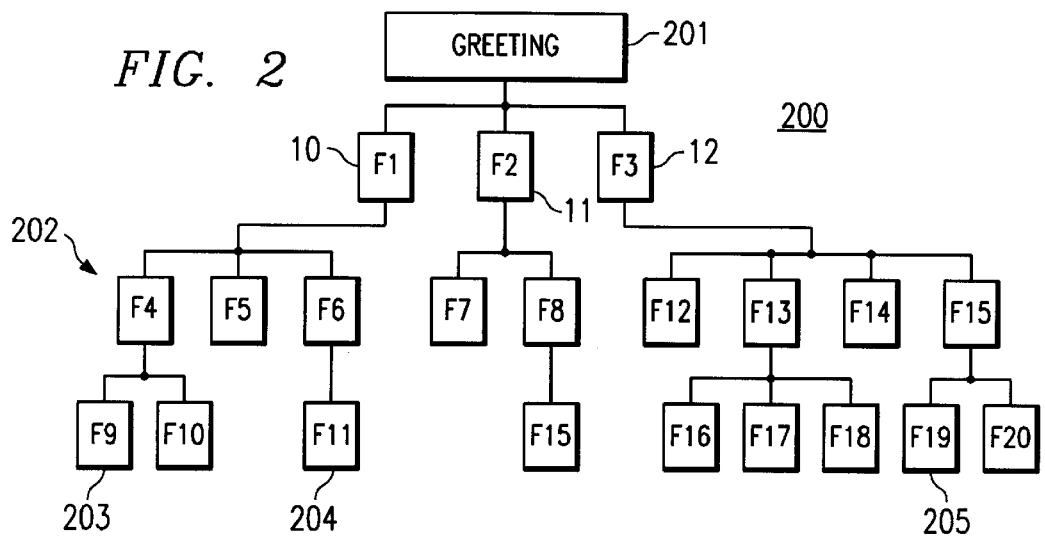
FIG. 2 depicts a telephone access decision tree.

FIG. 2 depicts the output menu or tree structure 200 from the device specific variable state transition model when a telephone 103 is used to access the system 100. As an example, the tree structure 200 shown in FIG. 2 defines 20 functions. These functions are the same functions shown in FIG. 1. The caller first receives a greeting 201 and a message defining the top level of input choices, shown as functions F1 10, F2 11, and F3 12. Selection of one of these choices reveals a second layer of functions. For example, if F1 10 is selected, the caller is presented with further options of F4, F5 and F6. However, the caller is not presented all of the different functions F1–F20 because of ergonomic limitations.

The device specific variable state transition model 104 has recognized the limitations of the callers telephone device 103 and has appropriately formatted the presentation of the functions. However, this has limited the users movement around the tree in that a caller cannot move directly from F9 203 to F11 204 without moving back up the tree to F1 10. This works similarly for a move from F9 203 to F19 205; except in this instance, the caller must return to the greeting 201.

Figure 3:
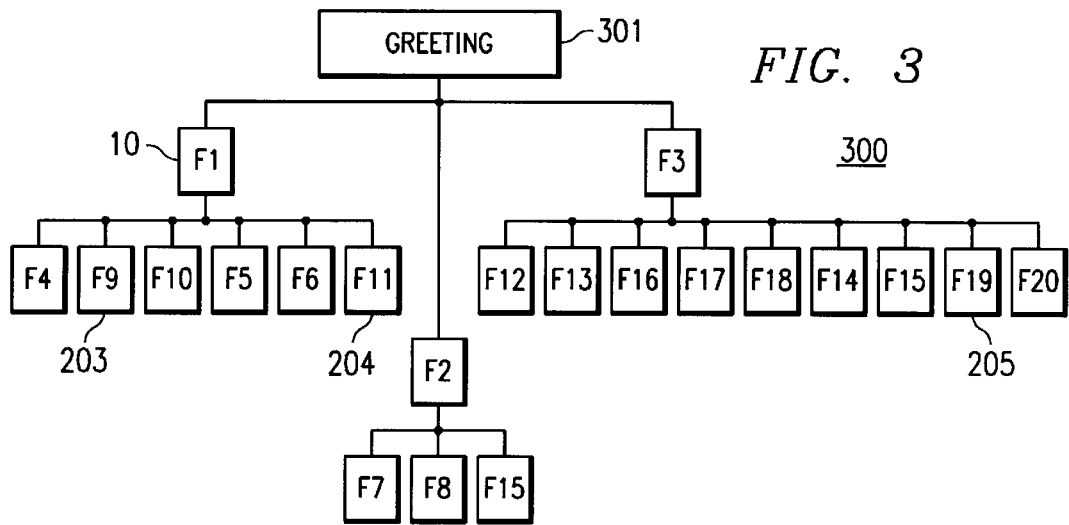
FIG. 3 depicts a screen phone or PDA decision tree.

FIG. 3 depicts the output menu or tree structure 300 from the device specific variable state transition model when a screen telephone or PDA 102 is used to access the system 100. As an example, the tree structure 300 shown in FIG. 3 defines 20 functions; these functions are the same functions shown in FIGS. 1 and 2. First, the caller is shown a greeting 301 and a message defining the top level of input choices, shown as functions F1 10, F2 11, and F3 12. Selection of one of these choices reveals a second layer of functions.

As compared to FIG. 2, however, the device specific variable state transition model 104 has recognized that the caller is using a screen telephone device or PDA 102, which has a small screen that is capable of displaying several lines of text or a few graphical icons, and thus has appropriately formatted the presentation of the functions so that some, but not all, are displayed at the same time. A small or diminutively sized screen is capable of displaying some of the functions on the screen simultaneously, but not all of the functions. In this instance, the user can freely move between F9 203 and F11 204 without moving back up the tree to F1 10. But the caller cannot move from F9 203 to F19 205 without returning to the greeting 201 because of the small screen size.

Figure 4:
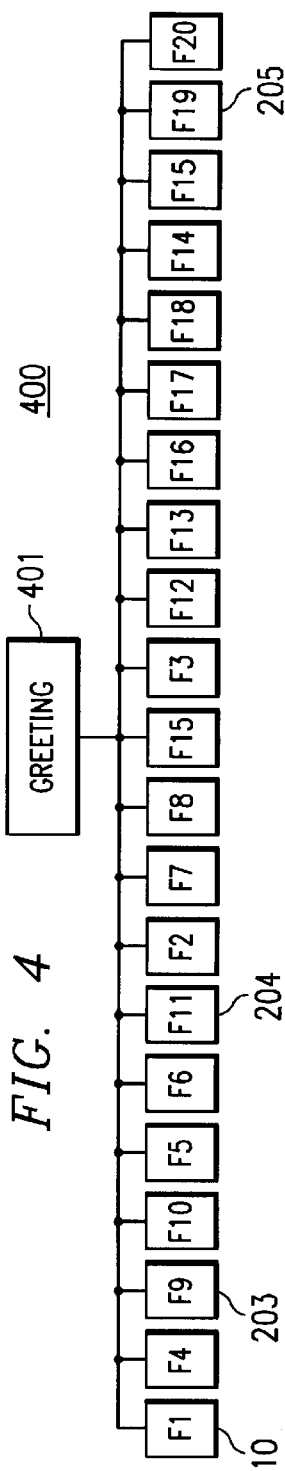
FIG. 4 depicts a personal computer decision tree.
Figure 7:
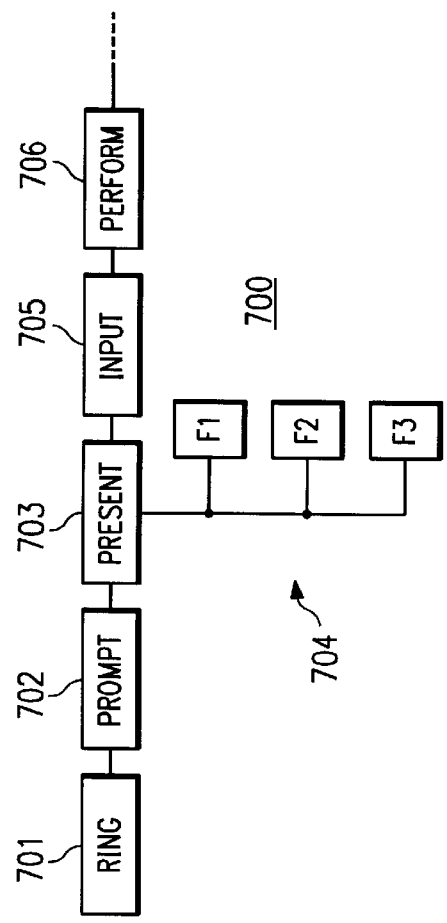
FIG. 7 depicts a flow diagram of a prior art program.

FIG. 4 depicts the output menu or tree structure 400 from the device specific variable state transition model when a personal computer 101 or other large screen device is used to access the system 100. A large or substantially sized screen is capable of displaying all or nearly all of the functions on the screen simultaneously. As an example, the tree structure 400 shown in FIG. 4 defines 20 functions, these functions are the same functions shown in FIGS. 1–3. First, the caller is shown a greeting 401 and then a text message or graphical icons that define all of the functions F1 to F20.

As compared to FIGS. 2 and 3, however, the device specific variable state transition model 104 has recognized that the caller is using personal computer 101, which has a large screen that is capable of displaying many lines of text or many graphical icons, and thus has appropriately formatted the presentation of the functions so that all of the functions are displayed at the same time. In this instance, the user can freely move between F9 203 and F11 204, as well as, from F9 203 to F19 205 without returning to the greeting 401.

FIG. 4 also depicts the tree structure 400 when using a natural language voice recognition system which means that if, for example, the caller using a telephone 103, screen phone 102, or PC base phone 101 utters a phrase such as "I want my savings account balance," the system would automatically invoke function F1 10. Using such as system would put all of the functions F1 to F20 at the disposal of the user at the same time.

Figure 5:
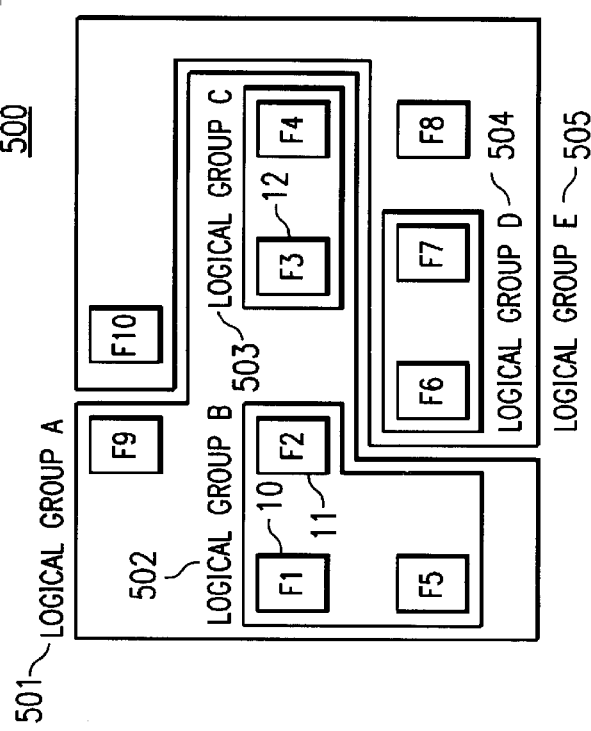
FIG. 5 depicts the logical groupings of related functions.

FIG. 5 depicts the logical groupings of related functions. This shows the functions and their relationship to each other and describes the hierarchy or priority of the particular functions. For instance, there are logical groupings in the banking system example previously discussed, such as types of accounts, e.g. savings, checking, credit cards, and loans, or types of transactions, e.g. balance inquiries, withdrawals, deposits, and transfers.

These groupings can be arranged into particular sets of functions that are roughly equivalent in precedence like withdrawals and deposits. Moreover, the different elements of the different groups can be combined to form various associated groups, such as all of the types of transactions can be combined with each of the account types. For example, savings can be combined with balance inquiries, withdrawals, deposits, and transfers to form a savings account transaction grouping.

FIG. 5 is a diagrammatic representation of these types of groups, but this could be described physically, graphically or in some text definition, which would show some logical grouping of these functions. FIG. 5 function F1 10 is associated with F2 and F3 in logical group B, but is also associated with F3, F4 and F9 in logical group A. This grouping of functions would support a program that generates the actual navigation structures of the access methods in determining how the choices are presented according to the different types of devices. In the case of touch-tone telephone input, it would use the information provided here in FIG. 5 to set a hierarchial menu structure shown in FIG. 2. In the case of access by a screen phone device, the system would provide some logical grouping choices in a graphical representation as shown in FIG. 3, either as a logical grouping of icons or text menu choices. Thus, the grouping diagram of FIG. 5 provides the necessary information to express the association between the different functions.

Figure 6:
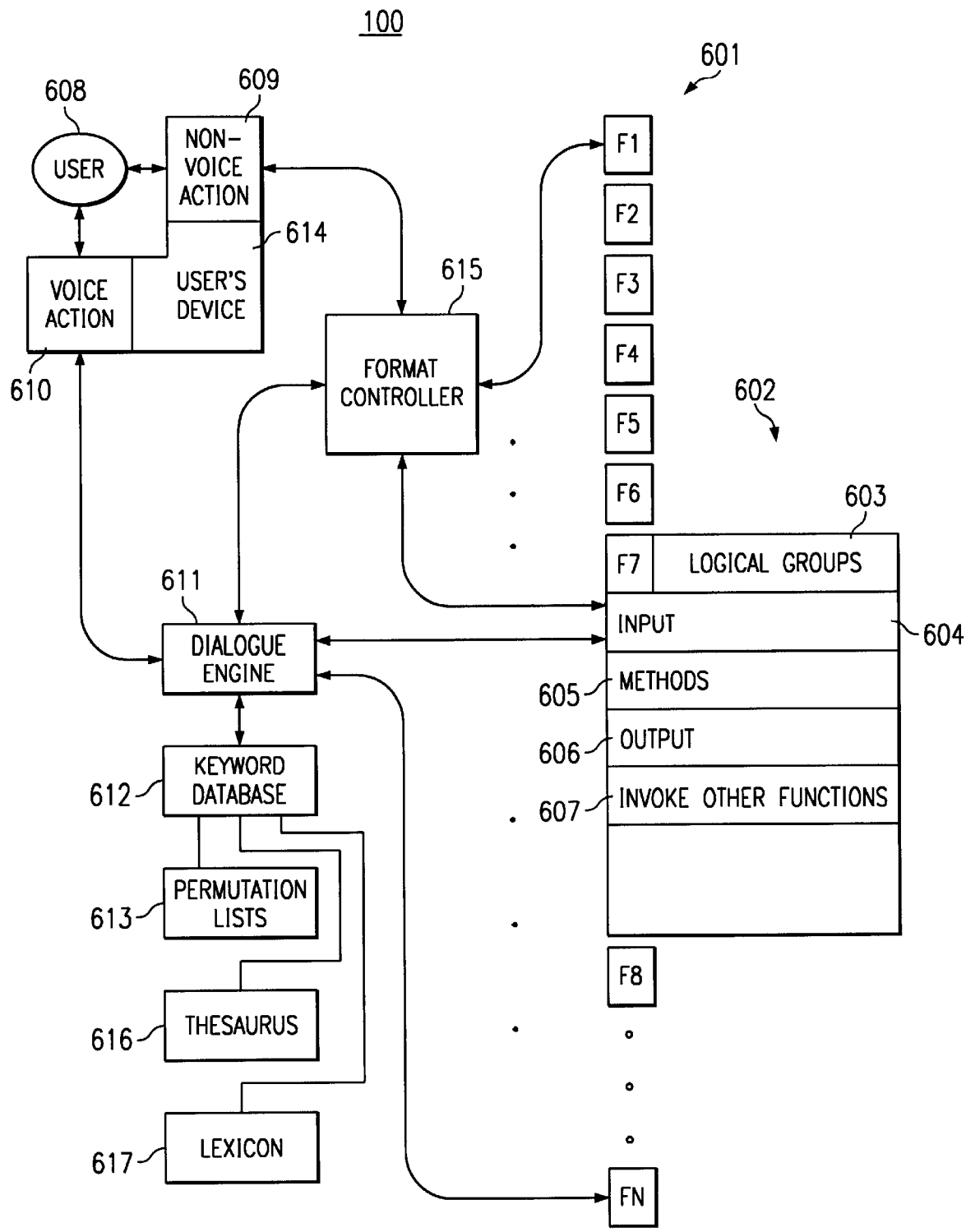
FIG. 6 depicts the device specific variable state transition model.

FIG. 6 depicts the device specific variable state transition model 104 that uses the groups of functions shown in FIG. 5 and arranges the functions according to the device type, as shown in FIGS. 2–4.

FIG. 6 includes a series of functions 601. These functions are the same functions depicted in previous figures. In keeping with the example of banking functions used previously, an example of a discrete function would be, for instance, a cleared checks function 602. This function is account specific, i.e., it is only applicable to the checking account. However, other functions, such as a balance inquiry function, would not be account specific and could be re-used or called by other functions, i.e, checking account, savings account, or credit card menu functions.

The cleared check function 602 involves looking/accessing a host system for a given account, then retrieving the details of the last several checks that have cleared through that account, and then formatting this information in a manner that is presentable to the caller, i.e., for a voice activated dialogue transaction as shown in FIG. 2, then speaking that information to the caller.

The cleared check function 602 has a certain number of required inputs 604; for example, there may be an account number or a security key like a pin number. Other inputs include parameters that are passed to the function from the user; for instance, the number of checks to be examined, such as the last five checks or the last ten checks. The cleared check function 602 also has a certain number of methods 605 for performing its function with the input 604. For example, within the function there are data access methods, data manipulation methods and data formatting methods. The function 602 has an output section 606 for sending the output back to the caller in a format acceptable to the device being used by the caller.

The cleared check function 602 has a logical group section 603 that defines links and associations to other functions as depicted in FIG. 5. The function 602 also has the ability to invoke other functions 607 when necessary. For example, cleared check function 602 can invoke a security function if the pin number is incorrectly entered.

The cleared check function 602 can be invoked by a user 608 in a number of different ways, depending upon the user's device 614. For instance, in a non-voice manner or graphical format 609, the function may appear as an icon to be activated by the caller. Another way is via voice dialogue 610, although this avenue is problematic because of the number of ways spoken language can describe the desired function. A user 608 could say "give me the history of the checking account", or "look at (or examine, retrieve, check, verify etc.) the last ten checks", and so on.

Thus, as a function 602 is developed for voice input action 610, a certain number of key action words or phrases will be described for that function. The key action words or phrases will be a starting point to describe that functionality. A further step, taken non-run time or during the development of the function, is to run the key action phrases through a lexicon-grammar engine that constructs the various permutations of the possible requests. If enough of the key word phrases are defined up front, and given a sufficiently intelligent grammar engine, then the dialogue engine 611 could determine the proper function that would satisfy the user's 608 needs and match the user's input request.

The permutation lists 613, and the key word data base 612 feeds the dialogue engine 611. The dialogue engine 611 is the reactive mechanism that allows the user 608 to call or otherwise verbally communicate with the system 100. The engine 611 parses a command sentence or expression into words or phrases. Theses words and phrases are examined by the engine for various key action phrases that are defined in the key word data base 612 and the expanded permutations of those key words stored in the permutation lists 613. The dialogue engine 611 would then determine which function is being invoked by the user from the data in the key word data base 612 and the lists 613. In the example shown in FIG. 6, the user 608 may have said, "what are the last ten checks that have cleared my account."

The format controller 615 organizes the functions into a hierarchical arrangement depending upon the type of device 614 of the user 608. The information about the user's device is obtained several ways. The most direct is that the format controller solicits the device type from the user, i.e., push one for a touch tone phone, two for a screen phone, etc. Another way is for the format controller to compare the signal characters of the command with a stored data base of such information to determine the type of device being used by the user. Another way is for the format controller to send interrogatory signals to the device and have the device respond as to its type. Once the user's device type is ascertained, the format controller will display the functions as shown in FIGS. 2–4. The format controller works with the dialogue engine to control the responses sent by the dialogue engine back to the user, such that if full natural language voice recognition is being utilized by the user, the format of the functions will appear as shown in FIG. 4. However, if only a voice response unit is being used (i.e., say one for savings), then the format of the functions as shown in FIG. 2 would be used.

Each function 601 has other inputs, either from voice or non-voice. In the example of FIG. 6, one of the required inputs is an account number and pin. Now, if these inputs are not provided, the dialogue engine 611 would not attempt to perform a function without having required fields filled. The engine 611 would either terminate the function request or it may invoke another function 607; for example, a security function would prompt the user to supply the missing account number and pin number. Then the security function would verify these numbers and fill in the data set of the invoking function 602. The security function, if needed, could invoke other functions.

Beginning with a limited number of key action words and phrases, followed by a process through grammar analysis, thesaurus 616 support, lexicon 617, and dictionaries (generating the various permutations of this relatively limited set of definitions), would allow for a more flexible system and make a natural language voice recognizer much more useful. Thus, it would open up a much broader range of dialogue and more useful approach to natural language dialogues between the user and the system.

The approach of this system is not independently defining a transaction engine here with all of the permutations and then providing a limited finite number of them for use. But rather, it describes the function and the general access methods, the data elements required, and the key action words and phrases that a user would typically use and building all of the permutations of that access method, automatically feeding the dialogue engine.

The use of key words and phrases has the same application in nonvoice application as in, for example, a screen phone. For a list selection of functions to be displayed, the choices may be narrowed to a few; or even a single item would then be added dynamically to a menu on a screen phone.

The dialogue engine is capable of learning new word/phrase associations for existing functions. For example, if the dialogue engine receives a command or request, and the engine is unable to determine the action or the function in the command because the choice of words used by the user to convey the command is not located in either the key word data base or the permutation lists, then the dialogue engine will ascertain the meaning of the command. The engine will do this by either asking the user to re-define the command in some other terms or consult built-in dictionaries, thesauruses, and the like to determine the most likely meaning of the command, and then proceed accordingly. Then engine will then update its permutation lists to contain the new reference from the command.

Because the functions are decoupled from the manner that the functions are invoked, additional functions may be added by the system manager without requiring revision of the existing functions. Only the key word data base and the permutation lists would have to be updated when a new function is added to the system. However, if the new function is going to be invoked by existing functions or will be associated with particular logical groups, then those particular, existing functions will have to be updated. Additionally, it may be possible for the user to define user specific functions characterizing a scripting preference for the user. These user defined functions would be formed from combining or modifying existing functions.

Although the present invention and its advantages have been described in detail, it should be understood that various changes, substitutions and alterations can be made herein without departing from the spirit and scope of the invention as defined by the appended claims.

What is claimed is:

1. A system for providing a user with a plurality of function choices, the system comprising:
   a plurality of functions, operable at a host system, having logical grouping information associated therewith, wherein at least one function is associated with more than one logical group; and
   a device specific variable state transition model providing grouping of the functions into function choices based upon a user device, separate from said host system, and said logical grouping information.

2. The system of claim 1, wherein functions of said plurality of functions have a plurality of data element dependencies associated therewith.

3. The system of claim 2, wherein said data element dependencies include function inputs.

4. The system of claim 2, wherein said data element dependencies include a function method, wherein said function method is operable with an input of said function in performance of said function.

5. The system of claim 4, wherein said function method is a data access method.

6. The system of claim 4, wherein said function method is a data manipulation method.

7. The system of claim 4, wherein said function method is a data formatting method.

8. The system of claim 2, wherein said data element dependencies include function outputs.

9. The system of claim 2, wherein said data element dependencies include other functions for invocation by a function of said plurality of functions.

10. The system of claim 1, wherein said device specific variable state transition model generates navigation structures of access methods determining how the function choices are presented according to different types of user devices.

11. The system of claim 10, wherein said navigation structures establish limits on movement between said function choices with respect to a first type of user device which are different than limits on movement between said function choices with respect to a second type of user device.

12. The system of claim 10, wherein said logical grouping information establishes a hierarchy of the particular functions.

13. The system of claim 10, wherein logical groups derived from said logical grouping information include functions that are substantially equivalent in precedence.

14. The system of claim 10, wherein logical groups derived from said logical grouping information include functions which have a related functionality.

15. The system of claim 10, wherein:
   the user device is selected from the group consisting of:
   a personal computer;
   a telephone;
   a screen telephone;
   a personal data assistant; and
   a telecommunication device for the deaf (TDD).

16. The system of claim 1, wherein the user device has a substantially sized display screen, and the function choices are grouped into a single level comprising all of the functions as function choices.

17. The system of claim 1, wherein the user device has a diminutively sized display screen and the function choices are formatted into at least two levels, each level comprising a portion of the functions as function choices.

18. The system of claim 1, wherein the user device lacks a display screen and the function choices are formatted into a plurality of levels, each level comprising a portion of the functions as function choices.

19. The system of claim 18, wherein levels of said plurality of levels comprise a plurality of function choices.

20. The system of claim 18, wherein the user device is a telephone, and wherein an access method associated with said function choices includes a voice response system.

21. The system of claim 18, wherein the user device is a telephone, and wherein an access method associated with said function choices includes a touch tone response system.

22. The system of claim 1, wherein the user device lacks a display screen and the function choices are formatted into a single level comprising all of the functions as function choices.

23. The system of claim 22, wherein the user device is a telephone, and wherein an access method associated with said function choices includes a natural language voice recognition system.

24. The system of claim 1, wherein the device specific variable state transition model comprises:
a key word data base comprising key words used to describe each function;
a plurality of permutation lists comprising expanded lists of phrases that are synonymous with respect to the key words; and
a dialogue engine for receiving voice input action from the user, parsing the input action into segments, searching the segments for key words and expanded lists of phrases, identifying a requested function in the voice input action, and activating the requested function.

25. The system of claim 24, wherein the dialogue engine comprises:
a learning operation for ascertaining a meaning and a function association for an unknown phrase received from the user, and amending the key word data base and permutation lists to include the unknown phrase.

26. The system of claim 24, wherein the permutation lists are predefined.

27. The system of claim 26, wherein the permutation lists are formed by applying a thesaurus application to the key word data base.

28. The system of claim 26, wherein the permutation lists are formed by applying a lexicon application to the key word data base.

29. The system of claim 26, wherein the permutation lists are formed by applying a lexicon application and a thesaurus application to the key word data base.

30. The system of claim 1, wherein the device specific variable state transition model comprises:
a format controller for determining characteristics of the user device, wherein grouping of the functions into function choices by said device specific variable state transition model into function choices based upon a device of the user through reference to said determined characteristics.

31. The system of claim 30, wherein the format controller determines the characteristics of the user device at least in part by querying the user.

32. The system of claim 30, wherein the format controller determines the characteristics of the user device at least in party by interrogating the device.

33. The system of claim 30, wherein the format controller determines the characteristics of the user device at least in party by analyzing signal characteristics of input action.

34. A variable state transition system for arranging a plurality of functions for presentation to a user based upon a device of said user, the system comprising:
a format controller for determining characteristics of a user device in communication with said system, wherein said format controller selects functions of said plurality of functions for presentation according to said determined characteristics of said user device, and wherein said format controller arranges said selected functions into function choices based upon limitations of said user device;
a key word data base comprising key words used to describe functions of said function choices;
a plurality of permutation lists comprising expanded lists of phrases that are synonymous with the key words; and
a dialogue engine for receiving voice input action from the user, parsing the input action into segments, searching the segments for key words and expanded lists of phrases, identifying a requested function in the voice input action, and activating a particular function choice in response thereto.

35. The system of claim 34, wherein the dialogue engine comprises:
a learning operation for ascertaining a meaning and a function association for an unknown phrase received from the user to thereby define a learned phrase, and amending at least one of the key word data base and permutation lists to include the learned phrase.

36. The system of claim 34, wherein:
the format controller determines the characteristics of the device by performing one of the group of methods consisting of querying the user, interrogating the device, and analyzing signal characteristics of the input action.

37. The system of claim 34, wherein the permutation lists are predefined.

38. A system for providing a plurality of functions to a user of the system, the system comprising:
means for storing key words associated with each function of said plurality of functions;
means for storing expanded lists of phrases that are synonymous with ones of the key words;
means for determining a characteristic of a user device associated with the user;
means for providing a function navigation structure accessible to the user based upon the determined characteristic, wherein a first navigation structure associated with a first user device type is different than a second navigation structure associated with a second user device type;
means for receiving input action from the user;
means for parsing the input action into segments;
means for searching the segments for information corresponding to ones of said key words and ones of said phrases; and
means for determining a function of said plurality of functions requested in said input action available to said user through said function navigation structure using information provided by said means for searching.

39. The system of claim 38, wherein the means for determining a function comprises:
means for ascertaining a meaning and a function association for an unknown phrase received from the user, and amending the key word data base and permutation lists to include the unknown phrase.

40. The system of claim 38, the means for determining a characteristic comprises:
means for determining the characteristic of the device by querying the user.

41. The system of claim 38, the means for determining a characteristic comprises:
means for determining the characteristic of the device by interrogating the device.

42. The system of claim 38, the means for determining a characteristic comprises:
means for determining the characteristic of the device by analyzing signal characteristics of a command issued by the device from the user.

43. A system for providing a plurality of functions to a user of the system, the system comprising:

means for determining a characteristic of a user device associated with the user; and means for providing a function navigation structure accessible to the user based upon the determined characteristic, wherein a first navigation structure associated with a first user device type is different than a second navigation structure associated with a second user device type.

44. The system of claim 43, further comprising:

means for arranging functions of the plurality of functions for presentation to said user based upon the determined characteristic, wherein the arrangement of functions corresponds to the function navigation structure accessible to the user.

45. The system of claim 43, wherein said function navigation structure establishes limits on movement between said function choices with respect to a first type of user device which are different than limits on movement between said function choices with respect to a second type of user device.

46. The system of claim 43, wherein functions of said plurality of functions have associated therewith logical grouping information.

47. The system of claim 46, wherein said function navigation structure is also based upon the logical grouping information.

48. The system of claim 46, wherein said logical grouping information associates at least one function with more than one logical group.

49. The system of claim 46, wherein said logical grouping information establishes a hierarchy of the particular functions.

50. The system of claim 46, wherein logical groups derived from said logical grouping information include functions that are substantially equivalent in precedence.

51. The system of claim 46, wherein logical groups derived from said logical grouping information include functions which have a related functionality.

52. A method for providing a plurality of functions to a user, the method comprising:

determining a characteristic of a user device associated with the user; and providing a function navigation structure accessible to the user based upon the determined characteristic, wherein a first navigation structure associated with a first user device type is different than a second navigation structure associated with a second user device type.

53. The method of claim 52, further comprising:

arranging functions of the plurality of functions for presentation to said user based upon the determined characteristic, wherein the arrangement of functions corresponds to the function navigation structure accessible to the user.

54. The method of claim 52, wherein said function navigation structure establishes limits on movement between said function choices with respect to a first type of user device which are different than limits on movement between said function choices with respect to a second type of user device.

55. The method of claim 52, wherein functions of said plurality of functions have associated therewith logical grouping information.

56. The method of claim 55, wherein said function navigation structure is also based upon the logical grouping information.

57. The method of claim 55, wherein said logical grouping information associates at least one function with more than one logical group.

58. The method of claim 55, wherein said logical grouping information establishes a hierarchy of the particular functions.

59. The method of claim 55, wherein logical groups derived from said logical grouping information include functions that are substantially equivalent in precedence.

60. The method of claim 55, wherein logical groups derived from said logical grouping information include functions which have a related functionality.

61. A variable state transition system for presenting a plurality of functions to a user, the system comprising:

a plurality of functions, ones of which are presented to the user for selection through a user device;

a format controller determining characteristics of the user device and selecting particular functions of said plurality of functions for presenting to said user based upon determined characteristics of the user device, wherein said presented functions are selected by said format controller;

a key word data base comprising key words stored in association with functions of said plurality of functions;

a plurality of permutations that are synonymous with the key words stored in association with said key words;

a dialogue engine for receiving input action from the user with respect to the presented functions, wherein the dialogue engine parses the input action into segments, searches the segments for key words and permutations, and identifies a function of the presented functions requested by the input action.

62. The system of claim 61, wherein functions of said plurality of functions have logical grouping information associated therewith, wherein at least one function is associated with more than one logical group.

63. The system of claim 61, wherein functions of said plurality of functions have a plurality of data element dependencies associated therewith.

64. The system of claim 63, wherein said data element dependencies include function inputs.

65. The system of claim 63, wherein said data element dependencies include a function method, wherein said function method is operable with an input of said function in performance of said function.

66. The system of claim 65, wherein said function method is a data access method.

67. The system of claim 65, wherein said function method is a data manipulation method.

68. The system of claim 65, wherein said function method is a data formatting method.

69. The system of claim 63, wherein said data element dependencies include function outputs.

70. The system of claim 63, wherein said data element dependencies include other functions for invocation by a function of said plurality of functions.

71. The system of claim 61, wherein the dialogue engine comprises:

a learning operation for ascertaining a meaning and a function association for an unknown input received from the user, and amending at least one of the key word data base and the permutations to include information regarding the unknown input.

72. A variable state transition system for presenting a plurality of functions to a user, the system comprising:

a plurality of functions, ones of which are presented to the user for selection through a user device;

a format controller determining characteristics of the user device and arranging the functions for presentation to the user based upon determined characteristics of the user device, wherein said presented functions are arranged by said format controller;

a key word data base comprising key words stored in association with functions of said plurality of functions;

a plurality of permutations that are synonymous with the key words stored in association with said key words;

a dialogue engine for receiving input action from the user with respect to the presented functions, wherein the dialogue engine parses the input action into segments, searches the segments for key words and permutations, and identifies a function of the presented functions requested by the input action.

* * * * *